(12) United States Patent
Phillips et al.

(10) Patent No.: US 6,442,912 B1
(45) Date of Patent: Sep. 3, 2002

(54) METHOD FOR RETROFITTING A SURFACE OF A HOUSE OR BUILDING

(75) Inventors: Jerry S. Phillips, Marietta, GA (US); David W. Brown, Oak Ridge, TN (US); Wayne Bean, Marietta, GA (US); Donald H. Sigler, Jr., Kalispell, MT (US)

(73) Assignee: Innovative Coatings Corporation, Kennesaw, GA (US)

( * ) Notice: Subject to any disclaimer, the term of this patent is extended or adjusted under 35 U.S.C. 154(b) by 0 days.

(21) Appl. No.: 09/695,546

(22) Filed: Oct. 24, 2000

Related U.S. Application Data

(62) Division of application No. 09/203,957, filed on Dec. 2, 1998.
(60) Provisional application No. 60/067,437, filed on Dec. 3, 1997.

(51) Int. Cl.[7] ............................................... E04G 21/00
(52) U.S. Cl. .................. 52/741.4; 52/745.09; 52/309.4; 52/506.01; 428/423.1; 428/304.4
(58) Field of Search ............................. 52/741.4, 741.3, 52/745.06, 745.09, 309.4, 309.5, 506.01, 506.05, 518, 543; 428/423.1, 304.4

(56) References Cited

U.S. PATENT DOCUMENTS

| | | | |
|---|---|---|---|
| 3,067,058 A | | 12/1962 | Gordon |
| 3,091,551 A | | 5/1963 | Robertson |
| 3,466,825 A | * | 9/1969 | Guddal ..................... 52/408 X |
| 3,668,173 A | * | 6/1972 | Wooster et al. |
| 3,671,355 A | | 6/1972 | Paymal |
| 3,714,128 A | * | 1/1973 | Rowton et al. |
| 3,811,996 A | | 5/1974 | Polk |
| 3,899,855 A | * | 8/1975 | Gadsby ........................ 52/90 |
| 4,021,401 A | | 5/1977 | Jeppsen |
| 4,109,033 A | | 8/1978 | Blankenhorn et al. |
| 4,256,501 A | | 3/1981 | Banino |
| 4,296,020 A | * | 10/1981 | Magrans |
| 4,320,163 A | | 3/1982 | Schwartz |
| 4,357,384 A | | 11/1982 | Jasperson |
| 4,365,000 A | | 12/1982 | Muller et al. |
| 4,395,457 A | | 7/1983 | Wyner |
| 4,559,239 A | | 12/1985 | Cenegy |
| 4,585,683 A | | 4/1986 | Curnow |
| 4,716,210 A | * | 12/1987 | Trummelmeyer et al. |
| 5,060,291 A | | 10/1991 | Albertelli |
| 5,151,130 A | | 9/1992 | Croft et al. |
| 5,236,994 A | | 8/1993 | Markusch et al. |
| 5,308,397 A | | 5/1994 | Whatcott |
| 5,344,490 A | * | 9/1994 | Roosen et al. |
| 5,348,582 A | | 9/1994 | Herzig et al. |
| 5,360,476 A | | 11/1994 | Whatcott |
| 5,401,798 A | | 3/1995 | Rasp et al. |
| 5,482,543 A | | 1/1996 | Bleve et al. |
| 5,540,022 A | * | 7/1996 | Morris ....................... 52/309.8 |
| 5,569,706 A | * | 10/1996 | Jacobs et al. |
| 5,571,562 A | | 11/1996 | Wakat |
| 5,580,375 A | | 12/1996 | Feldstein et al. |
| 5,622,556 A | | 4/1997 | Shulman |
| 5,631,052 A | | 5/1997 | Andersen et al. |
| 5,652,301 A | * | 7/1997 | Schmidt et al. |
| 5,654,085 A | * | 8/1997 | Markusch ................... 428/221 |
| 5,725,652 A | | 3/1998 | Shulman |
| 5,740,643 A | * | 4/1998 | Huntley ........................ 52/265 |
| 5,759,695 A | * | 6/1998 | Primeaux, II |
| 5,777,024 A | | 7/1998 | Killilea et al. |
| 5,803,964 A | | 9/1998 | Scarborough |
| 5,810,956 A | | 9/1998 | Tanis et al. |
| 5,890,327 A | | 4/1999 | Merser et al. |

\* cited by examiner

Primary Examiner—Carl D. Friedman
Assistant Examiner—Brian E. Glessner
(74) Attorney, Agent, or Firm—Merchant & Gould

(57) ABSTRACT

The present invention is a synthetic insulation and finish system that is used on both residential and commercial structures, including the exterior and interior walls. More specifically, the present invention is in the field of synthetic stucco and the like. In addition, the present invention includes novel hardboard siding waterproofing, hardboard/wood siding retrofitting, architectural moldings and ceiling tiles that are coated with an elastomeric coating, preferably an aromatic and/or aliphatic polyurea.

34 Claims, 1 Drawing Sheet

METHOD FOR RETROFITTING A SURFACE OF A HOUSE OR BUILDING

CROSS-REFERENCE TO RELATED APPLICATIONS

This application is a divisional of U.S. patent application Ser. No. 09/203,957, filed on Dec. 2, 1998; which claims the benefit of priority to U.S. Provisional Application No. 60/067,437, filed Dec. 3, 1997.

TECHNICAL FIELD

The present invention is in the field of synthetic insulation and finish systems that are used on both residential and commercial structures including the exterior and interior walls. More specifically, the present invention is in the field of synthetic stucco and the like. In addition, the present invention includes novel hardboard siding waterproofing, hardboard/wood siding retrofitting, architectural moldings and ceiling tiles.

BACKGROUND OF THE INVENTION

Synthetic stucco has been enormously popular in recent years for finishing the outside and inside of residential and commercial buildings. The most common form of synthetic stucco is an acrylic latex binder with various fillers, including sand and the like. The industry has coined the phrases of EIFS and DEFS which are Exterior Insulation and Finish Systems and Direct Applied Exterior Finish Systems. The main difference being that the latter does not include an "insulating" feature.

Furthermore, synthetic stucco has been used recently for the interior of both residential and commercial structures because of the esthetic values one can obtain when finishing walls.

In the typical EIFS installation, several steps must be accomplished to apply the synthetic stucco to a structure. First, a base substrate is attached to the side of the structure. This base substrate can be OSB (Oriented Strand Board), plywood, brick, tilt-up, poured, or precast concrete, masonry, wood, cement board, metal, tile, glazed brick, glazed unit masonry, exposed aggregate finish, fire retardant boards and gypsum type boards.

Next, an insulating board such as STYROFOAM® or any other expanded and/or extruded polystyrene or insulating material which will increase the wall's insulating value is fastened to the base substrate.

On top of the insulating boards, a base coat made of polymer-modified cement is applied. Once the base coat has been applied a nonmetallic reinforcing fabric, such as fiberglass mesh, is imbedded into the base coat to add strength to the system.

Finally, an acrylic finish coat or other similar coat is applied to complete the system. Normally, this finish coat will have a coloring agent admixed therein as well as an ultraviolet inhibitor. The finishing coat can be applied in a variety of ways including troweling or spraying, depending upon the final desired aesthetic result.

Over the past several years, many of the synthetic stucco systems that have been applied have developed problems. One of the most common problems is the influx of moisture at joints, windows, and the base of the house. This moisture causes rotting of the underlying wood structure. The extent of the problem has been of such a magnitude that the industry has recommended changes to the building codes to make a "drainable" EIFS system. Specifically, the system now requires additional steps. A space between the insulation and the base substrate is created. Additionally, a moisture barrier such as TYVEK® or other moisture barrier material needs to be installed. Also, the industry requires that the insulating boards have notches, grooves, channels and/or some other form of pathway for water to flow down and out of the system. The industry has generally accepted the fact that water may penetrate at various interfaces and a method for the water to exit the wall cavities is to be included. Another problem is the fragile nature of a synthetic stucco system. Typically, a synthetic stucco wall can easily be punctured or ripped. Repair is expensive and it is often difficult to match colors.

What is needed is a synthetic stucco system that is completely waterproof over a long period of time. The synthetic stucco system should also be highly resistant to puncture or damage due to collision. In addition, the synthetic stucco system should be easy to apply.

In the building industry, architectural moldings are widely used to finish the interior and exterior of buildings. These moldings are commonly manufactured by intricate cutting of various woods. Application of the moldings is time consuming and difficult and requires a high degree of skill on the part of the workperson applying the molding. What is needed is an architectural molding that is easy to manufacture and to apply to a building.

Also, over the past several years the building industry has produced exterior siding made from wood fiber, wax and resins that is widely known as hardboard siding. This type of siding has been produced in what is referred to as lap boards and/or sheets. In recent years, this type of siding has come under attack due to the potential increase of the material to absorb rainwater along the bottom edges or what is referred to in the industry as the "Drip Edge". When the siding absorbs moisture, the board/panel begins to separate, which in turn encourages more water absorption, leading to decay. What is needed is an easy way for the manufacturers of this type of siding to prevent the absorption of rainwater and/or condensation along the bottom edge.

Next, the building industry has manufactured for many years ceiling tiles that are fabricated from various fibers including, but not limited to, wood fibers. The common problem with the majority of these tiles is that they are easily broken and once water is absorbed into the material they become discolored and have to be replaced. What is needed is a ceiling tile that is lightweight, durable and resistant to water stains.

Finally, in the building industry, it is often required to remove worn and damaged exterior siding from a house and replace it with a new exterior coating. For example, many of the composite and/or wood sidings have not held up well over time and, in several years, the siding fades or begins to deteriorate. Additionally, the homeowner will often simply want to change the facade of his or her house. What is needed is an inexpensive and simple method of changing the exterior of a house or other building so that the new exterior of the house or other building is well insulated, waterproof, durable and is aesthetically pleasing.

SUMMARY OF THE INVENTION

The present invention addresses the foregoing problems in synthetic stucco systems by providing a system that is easy and inexpensive to apply, is completely waterproof and is highly durable. In one embodiment, the present invention utilizes conventional acrylic finishing coats. In another embodiment, the present invention does not require a finishing coat and can be applied in a single step.

The present invention comprises applying a coat of an aromatic or aliphatic polyurea or a polyurethane, epoxy or other elastomeric system to a base substrate or insulation board. A conventional finishing coat is then applied over the polymerized polymer coating. No mesh is required in applying the present invention. In another embodiment, the elastomeric system, preferably an aliphatic polyurea, is applied to the base substrate wherein the elastomeric system has a filler and UV stable pigment that results in a final desired texture and color.

Synthetic stucco prepared according to the present invention results in a satisfactory, aesthetically pleasing product that is firmly bound to the substrate and automatically seals joints and corners so that moisture cannot seep under the stucco coating.

The present invention includes synthetic architectural moldings that are manufactured from a material including, but not limited to, expanded and/or extruded polystyrene, polyurethane and blown polyethylene foams. The foam is cut, extruded or molded into the desired shape and is then coated with an elastomeric system, preferably polyurea, which can be either aromatic or aliphatic. Once coated with an aromatic polyurea, the molding can be top coated with various acrylic paints to obtain the desired color and gloss. Additionally, a substrate can be coated with an aliphatic polyurea coating that includes the required pigments to coat the molding in one step. The resulting synthetic architectural molding is then easily cut and applied to a surface. The synthetic architectural molding can simply be applied using commercially available adhesives or, including but not limited to, two-sided tape. In addition, the synthetic architectural molding of the present invention can be manufactured with a wide variety of textures and additives, such as fire retardants, to reduce the possibility of combustion.

The present invention also includes ceiling tiles manufactured from fiber and or other material including, but not limited to, expanded and/or extruded polystyrene, polyurethane and blown polyethylene foams that are coated with the elastomeric system, preferably an aromatic or aliphatic polyurea. The ceiling tiles of the present invention are much more durable and waterproof versus conventional ceiling tiles and any desired color or texture can be applied in the elastomeric coating system.

The present invention includes a method and composition for retrofitting the exterior of a house or other building. The method of retrofitting the exterior of a house or other building comprises a foam board including, but not limited to, expanded and/or extruded polystyrene, polyurethane and blown polyethylene foams, that has one side that is the mirror image of the building exterior. The foam board of the present invention can be applied to the building exterior and, because the side that is applied to the building is the mirror image of the building exterior, the foam board fits tightly to the building exterior with a minimum of space between the foam board and the building exterior. The outside surface of the foam board is then coated with an elastomeric system, such as an aromatic and/or aliphatic polyurea. Finally, if the aromatic system is used to coat the foam board, then an acrylic finish coat or other similar coat is applied to complete the system. The resulting exterior is aesthetically pleasing, increases the insulation of the building, and is far more durable and waterproof than the original exterior.

Accordingly it is an object of the present invention to provide a synthetic stucco system that is waterproof and is more durable than conventional stucco systems.

It is another object of the present invention to provide a synthetic stucco system that is easy and efficient to apply.

It is yet another object of the present invention to provide a synthetic stucco system that can utilize conventional stucco finishing coats.

It is another object of the present invention to provide a durable and easy to apply architectural molding.

It is yet another object of the present invention to provide a system for retrofitting the exterior of a house or other building that was previously built with hardboard or wood siding thereby providing an easy way to apply an exterior system that increases the insulation on the house as well as providing an aesthetically pleasing, waterproof and durable exterior surface.

It is yet another object of the present invention to provide a waterproof system for hardboard/wood siding.

These and other objects, features and advantages of the present invention will become apparent after a review of the following detailed description of the disclosed embodiments and the appended claims.

DETAILED DESCRIPTION

Figure 1:
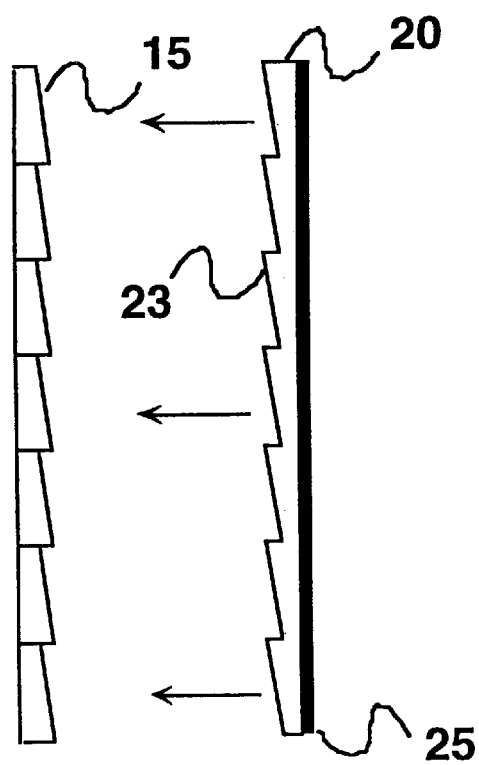
FIG. 1 shows a cross section of a hardboard/wood siding and a cross section of a foam board for retrofitting a building exterior.

One embodiment of the present invention is a synthetic stucco system that is waterproof and durable. The present invention includes a method of applying the synthetic stucco system of the present invention comprising the application of an elastomeric coating to a base substrate or insulation board and allowing the elastomeric coating to cross-link and fully react. A conventional finishing coat can then be applied to the elastomeric coating, thereby providing a pleasing and durable stucco appearance to the structure. The present invention also includes a composition comprising a base substrate or insulation board, a polymer coating on the base substrate or insulation board, and a finishing coat.

Another embodiment of the present invention includes a method of applying a synthetic stucco system in a single step. This embodiment of the present invention includes adding to the polymer that is to be applied to the base substrate or insulation board, fillers and coloring agents that provide a texture and color to the applied polymer that is similar to stucco. Fillers and additives that can be used with the present invention include, but are not limited to, sand, glass, fibers, calcium carbonate, coal, granite, silica, clay, talc, mica, pigments, ceramics, flame retardants, (e.g., phosphonic acid, methyl-,(5-ethyl-2-methyl-1,3,2-dioxaphosphorinan-5-yl)methyl methyl ester, phosphonic acid, methyl-,(5-ethyl-2-methyl-1,3,2-dioxaphosphorinan-5-yl)methyl ester, P,P'-oxide sold under the trademark ANTIBLAZE N, Phosphoric acid, 2,2 bis(chloromethyl)-1, 3-propanediyl tetrakis(2-chloroethyl)ester, ethanol, 2 chlor-, phosphate (3:1) sold under the trademark ANTIBLAZE 100 and tris(monochloropropyl)phosphate sold under the trademark ANTIBLAZE 80 by Albright & Wilson, Glen Allen, Va., albright-wilson.com), multicolored quartz, sea shells, recycled products, fiberglass. In this embodiment of the present invention, the polymer is applied to the base substrate or insulation board, preferably by spraying, at a thickness that provides the desired aesthetic qualities and strength characteristics.

The base substrate can be any conventional building material including, but not limited to, extruded and/or expanded polystyrene foam, polyurethane foam, blown polyethylene foam OSB (Oriented Strand Board), plywood, brick, tilt-up walls (walls that have been precast from concrete and upon delivery at the job site that are "tilt up" into position via crane), poured, or precast concrete, masonry, wood, cement board, metal, tile, glazed brick, glazed unit masonry, exposed aggregate finish, fire retardant boards and gypsum type boards, and the like. The base substrate or insulation board does not need to be treated in any way before the application of the polymer coat. However, one can utilize the notched, grooved and channeled STYROFOAM® board to remove any condensation that might appear due to moisture having formed on the interior walls. The requirement for a mesh in the prior art is eliminated.

In another embodiment, the present invention includes synthetic architectural moldings that are manufactured from a foam such as extruded and/or expanded polystyrene, polyurethane and blown polyethylene foams. The foam is cut or molded into the desired shape and is then coated with an the elastomeric system, preferably an aromatic or aliphatic polyurea optionally containing a fire retardant. The resulting synthetic architectural molding is then easily trimmed and applied to the appropriate surface. The synthetic architectural molding can be easily applied to a surface using commercially available adhesives including, but not limited to, double-sided tape. Another advantage of the synthetic molding of the present invention is the ability to manufacture the molding with the aliphatic polyurea system and have the finish coat applied in one step, eliminating the need to prime and apply a finish coat at the job site. With the aliphatic system, the finish color of the molding can be applied at the manufacturing facility. In addition, the synthetic architectural molding of the present invention can be manufactured with a wide variety of textures.

The present invention also includes ceiling tiles manufactured from materials including, but not limited to, fiber and foam (such as, expanded, extruded polystyrene, polyurethane and blown polyethylene), that are coated with an the elastomeric system, preferably an aromatic and/or aliphatic polyurea as described herein. The ceiling tiles of the present invention are much more durable and waterproof than conventional ceiling tiles, and any desired color (with the aliphatic system) or texture can be applied to the elastomeric coating system.

The present invention includes a method and composition for retrofitting the exterior of a house or other building. The present invention also includes the retrofitting the exterior of a house or other building with materials including a foam board that has one side that is the mirror image of the building exterior. The foam board can be applied to the building exterior and, because the side that is applied to the building is the mirror image of the building exterior, the foam board fits tightly to the building exterior with a minimum of spaces between the foam board and the building exterior. The outside surface of the foam board is then coated with an elastomeric system, preferably an aromatic and/or aliphatic polyurea. Then an acrylic finish coat or similar coat is optionally applied to complete the system. The resulting exterior is aesthetically pleasing, increases the insulation of the building, and is far more durable than the original exterior.

Figure 2:
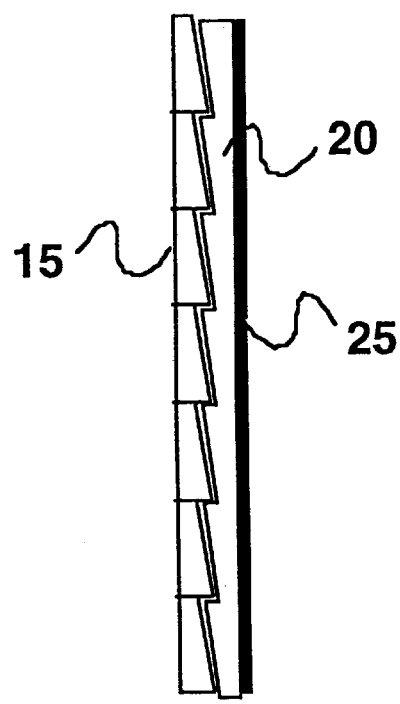
FIG. 2 shows a cross section of the hardboard/wood siding with the foam board attached thereto.

Referring now to FIG. 1, a typical house will have a hardboard siding 15. A foam board 20 is prepared wherein a first side 23 of the foam board 20 is the mirror image of the hardboard siding 15 of the exterior of the building. The foam board 20 can be coated with the elastomeric system 25 before the foam board 20 is applied to the exterior of the building or it can be applied after the foam board 20 is applied to the exterior of the building. Referring now to FIG. 2, the foam board 20 is attached to the hardboard siding 15 so that the first side 23 is the mirror image of the hardboard siding 15 and there is a minimum of space between the hardboard siding 15 and the first side 23 of the foam board 20. The foam board 20 is preferably attached using commercially available adhesives. The foam board 20 can also be attached to the hardboard siding 15 using nails or screws or a combination of nails or screws and commercially available adhesives including, but not limited to, polyurea. Preferably, the elastomeric coating 25 is applied before the foam board 20 is attached to the hardboard siding 15. This is done so that during the shipment of the individual panels, breakage is kept to a minimum. Upon installation, it is the preferred method to spray apply aliphatic and/or aromatic polyurea to the butt joints between each panel so as to seal any openings which would allow for water, air and insects to enter the substrate. It is to be understood that the foam board 20 can be manufactured so that it is the mirror image of virtually any building exterior.

The polymer that is applied to the base substrates or insulation boards includes, but is not limited to, aromatic or aliphatic polyurea, polyurethane, epoxy, polyurethane-polyurea hybrids or other similar polymer. Aromatic is related to, or characterized by, the presence of at least one benzene ring, used of a large class of monocyclic, bicyclic and polycyclic hydrocarbons and their derivatives (as benzene, touluene, etc.) and in relation to some unsaturated heterocylics compounds. Aliphatic is of a large class of organic compounds characterized by an open chain structure and consisting of a paraffin, olefin, acetylene hydrocarbons and their derivatives.

The desired polymer is an aromatic or aliphatic polyurea with fire retardants added. Polyureas are typically supplied in monomer form as two solutions. One solution is an isocyanate and the second solution is a polyamine. The resulting polymer after mixing the two components is a polyurea. The general reaction is shown as follows:

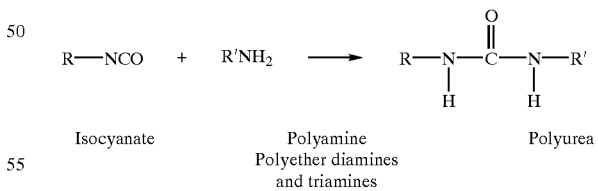

Another desired polymer is polyurethane which is supplied as two components, an isocyanate and a polyether or polyester polyol. The two solutions are mixed immediately before application to the base substrate or insulation board. The polyurethane system requires the use of a catalyst such as an organotin, i.e., dibutyl tin dilaurate. The general reaction for the production of a polyurethane polymer is as follows:

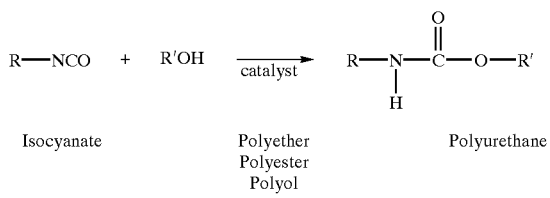

| Isocyanate | Polyether Polyester Polyol | Polyurethane |

For the application of polyurea to a base substrate or insulation board, a polyether polyamine is mixed with the isocyanate immediately before the application of the mixture. The mixing of the two components is typically done in a spray gun and the mixture is sprayed onto the base substrate or insulation board. Polyurea is the desired coating because the formation of the polymer does not require a catalyst and the reaction is relatively temperature insensitive, as well as relatively insensitive to water. Also, since polyurea has no volatile organic compounds (VOC's) the utilization of polyurea does not cause any EPA problems for the applicator or detriment to the STYROFOAM® insulation board.

Polyamines that can be used in practicing the present invention include, but are not limited to, JEFFAMINE® D2000 and JEFFAMINE® T5000 (Huntsman Corp., Houston, Tex.), which are amine-terminated polypropylene glycols having the following general structures:

$$H_2N-CH-CH_2[O-CH_2CH]_xNH_2 \quad \text{or}$$
$$\quad\quad\quad | \quad\quad\quad\quad\quad\quad |$$
$$\quad\quad\quad CH_3 \quad\quad\quad\quad\quad CH_3$$

JEFFAMINE® D2000

$$\quad\quad\quad\quad CH_3 \quad\quad CH_3$$
$$\quad\quad\quad\quad\ |\quad\quad\quad\ |$$
$$H_2CO[CH_2CHO]_x\ CH_2CHNH_2$$
$$\quad\quad\quad |$$
$$\quad\quad\quad CH_3 \quad\quad CH_3$$
$$\quad\quad\quad |\quad\quad\quad\ |$$
$$HCO[CH_2CHO]_y\ CH_2CHNH_2$$
$$\quad\quad\quad |$$
$$\quad\quad\quad CH_3 \quad\quad CH_3$$
$$\quad\quad\quad\ |\quad\quad\quad\ |$$
$$H_2CO[CH_2CHO]_z\ CH_2CHNH_2$$

JEFFAMINE® T5000 where in JEFFAMINE® D2000, x is equal to 33.1, and in JEFFAMINE® T5000, (x+y+z) is equal to 81; ETHACURE® 100 (Albemarle Corporation, Baton Rouge, La.), which is diethyltoluenediamine having the following major isomers:

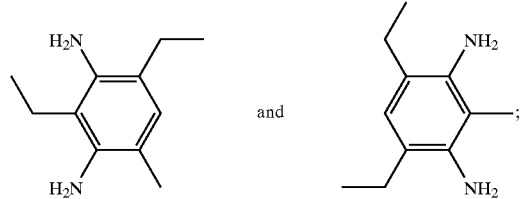

3,5-diethyltoluene-2,4-diamine   3,5-diethyltolune-2,6-diamine and UNILINK® 4200 (UOP, Des Plaines, Ill.), which has the following formula:

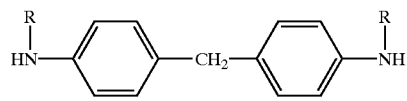

wherein R represents sec-butyl moieties. The preferred isocyanate is diphenylmethane diisocyanate (available from ICI, West Deptford, N.J. under the tradename RUBINATE®).

The polyamines can be mixed together to form the desired physical properties. For synthetic stucco, the resulting polyurea should be rigid and exhibit a high tensile strength.

In practicing the present invention, the isocyanate and the polyamine solutions (Solution A and Solution B respectively) are mixed immediately before application to the base substrate or insulation board. The mixing is done in the mixing portion of application gun under pressure and the resulting mixture is applied uniformly to the base substrate or insulation board. The mixture that is applied to the base substrate or insulation board cures rapidly and results in a uniform coating. The thickness of the coating according to the present invention will vary depending upon the final physical qualities desired. The thickness of the coating is between approximately 1 mil and 250 mils, with a desired thickness of between 60 and 75 mils, and the most desired thickness of approximately 62.5 mils, which is 1/16 of an inch.

One example of a finishing coat is shown in the following formula:

| RAW MATERIALS | POUNDS | GALLONS |
| --- | --- | --- |
| ACRONAL ® 296 D[1] | 211.18 | 24.33 |
| TKPP @ 50% | 5.32 | 0.39 |
| PIGMENT DISPERSER ® NL[2] | 3.49 | 0.34 |
| PROXEL GXL[2] | 1.98 | 0.21 |
| Mineral Spirits | 34.77 | 5.30 |
| NATROSOL 250 HR[3] @3% | 4.46 | 0.55 |
| Byk 045[4] | 2.05 | 0.25 |
| BASOPHOB ® WDS[2] | 47.52 | 5.76 |
| Water | 30.00 | 3.60 |
| Kronos 2101[5] | 68.90 | 2.12 |
| Omyacarb 5[6] | 246.15 | 10.94 |
| Georgia Marble OZ White[7] | 198.45 | 8.82 |
| Georgia Marble 40-200[7] | 881.78 | 39.19 |

[1]BASF Corporation, Charlotte, NC
[2]ICI Biocides, Wilmington, DE
[3]Aqualon Co., Wilmington, DE
[4]Byk-Chemie, Wallingford, CT
[5]Kronos, Houston, TX
[6]Omya Inc, Proctor, VT
[7]Georgia Marble, Kennesaw, Ga A similar finish coat can be obtained from a variety of manufacturers including, but not limited to, Dryvit Systems, Inc. (West Warwick, R.I.), Parex, Inc. (Redan, Ga.), Sto Corporation (Atlanta, Ga.), Finestone (Adrian, Mich.), and Universal Polymers, Inc. (Springfield, Mo.).

This invention is further illustrated by the following examples, which are not to be construed in any way as imposing limitations upon the scope thereof. On the contrary, it is to be clearly understood that resort may be had to various other embodiments, modifications, and equivalents thereto which, after reading the description herein, may suggest themselves to those skilled in the art without departing from the spirit of the present invention.

EXAMPLE 1

A fake wood panel with a window installed was sprayed with a polyurea formulation having the following formula:

|  | Solution A |
| --- | --- |
| RUBINATE ® | 100% |

|  | Solution B |
| --- | --- |
| UNILINK ® | 5.0% |
| JEFFAMINE ® D2000 | 64.0% |
| ETHACURE ® 23.0% |  |
| JEFFAMINE ® T5000 | 8.0% |

The components of Solution B were mixed together 1:1 by volume and the polymer solution (Solution A and Solution B) was applied using a plural component spray machine to a thickness of approximately 62.5 mils. A stucco finishing coat, for example, similar to the previously cited formula, was then applied by hand troweling the finish coat on top of the polyurea coat.

EXAMPLE 2

A STYROFOAM® panel was sprayed with a polyurea formulation having the following formula:

|  | Solution A |
| --- | --- |
| RUBINATE ® 9432 | 100% |

|  | Solution B |
| --- | --- |
| UNILINK ® 4200 | 3.0% |
| JEFFAMINE ® D2000 | 65.875% |
| ETHACURE ® 100 | 23.125% |
| JEFFAMINE ® T5000 | 8.0% |

The components of Solution B were mixed together 1:1 by volume and the polymer solution (Solution A and Solution B) was applied using a plural component spray machine to a thickness of approximately 62.5 mils. A stucco finishing coat, similar to the previously cited finish coat formula, was then trowel applied to the polyurea coat.

EXAMPLE 3

A STYROFOAM® panel was sprayed with a flame resistant polyurea formulation having the following formula:

|  | Solution A (parts) |
| --- | --- |
| RUBINATE ® 9432 | 86.95 |
| ANTIBLAZE ® 100 | 13.05 |

|  | Solution B (parts) |
| --- | --- |
| UNILINK ® 4200 | 4.34 |
| JEFFAMINE ® D2000 | 55.54 |
| JEFFAMINE ® T5000 | 6.94 |
| Baytec 505 | 20.07 |
| Black Dispersion | 0.06 |
| ANTIBLAZE ® 100 | 13.05 |

The components of Solution B were mixed together 1:1 by volume and the polymer solution (Solution A and Solution B) was applied using a plural component spray machine to a thickness of approximately 62.5 mils. A stucco finishing coat, similar to the previously cited finish coat formula, was then trowel applied to the polyurea coat.

It should be understood, of course, that the foregoing relates only to preferred embodiments of the present invention and that numerous modifications or alterations may be made therein without departing from the spirit and the scope of the invention as set forth in the appended claims.

What is claimed is:

1. A method for retrofitting an exterior surface of a house or building comprising:
    attaching a foam board to an exterior surface of a house or building such that an inner surface of the foam board is adjacent to the exterior surface of the house or building, wherein the inner surface of the foam board has a surface profile that is a mirror image of the exterior surface of the house or the building; and
    applying a first coating on an outer surface of the foam board, wherein the first coating comprises a polyurea formed by reacting (A) one or more polyether diamines and polyether triamines with (B) one or more isocyanates.

2. The method of claim 1, wherein the step of applying the first coating is prior to the step of attaching the foam board to the house or building.

3. The method of claim 1, wherein the foam board comprises polystyrene foam, polyurethane foam, or polyethylene foam.

4. The method of claim 1, wherein the foam board comprises expanded foam, extruded foam, or a combination thereof.

5. The method of claim 1, wherein the foam board is attached to the house or building by one or more adhesives, nails, screws, or a combination thereof.

6. The method of claim 1, wherein the foam board is attached to the house or building by one or more adhesives, wherein at least one adhesive comprises polyurea.

7. The method of claim 1, wherein the exterior surface of the house or building comprises oriented strand board, plywood, brick, concrete, masonry, wood, cement board, metal, tile, glazed brick, glazed unit masonry, exposed aggregate finish, fire retardant board, or hardboard.

8. The method of claim 7, wherein the exterior surface of the house or building comprises hardboard.

9. The method of claim 1, wherein the first coating is sprayed onto the outer surface of the foam board.

10. The method of claim 1, wherein the first coating comprises an aliphatic polyurea and at least one of a filler and a pigment.

11. The method of claim 1, further comprising:
    applying a second coating onto an outer surface of the first coating; wherein the first coating comprises an aromatic polyurea, and the second coating comprises at least one of a filler and a pigment.

12. The method of claim 10, wherein the filler comprises at least one of sand, glass, fibers, calcium carbonate, coal, granite, silica, clay, talc, mica, ceramics, flame retardants, multicolored quartz, and sea shells.

13. The method of claim 11, wherein the filler comprises at least one of sand, glass, fibers, calcium carbonate, coal, granite, silica, clay, talc, mica, ceramics, flame retardants, multicolored quartz, and sea shells.

14. The method of claim 1, wherein the polyurea is formed by reacting (A) one or more polyether diamines and polyether triamines with (B) diphenylmethane diisocyanate.

15. the method of claim 1, wherein the first coating has a coating thickness of from about 60 mil to about 75 mil.

16. A retrofitted building made by the method of claim 1.

17. The method of claim 1, wherein the exterior surface is a wall of the house or building.

18. The method of claim 1, wherein the polyurea is formed by reacting one or more polyether diamines and polyether triamines, one or more diethyltoluenediamines, and N,N'-di-sec-butyl-4,4'-methylene dianiline with one or more isocyanates.

19. The method of claim 1, wherein the one or more polyether diamines and polyether triamines comprise at least one of

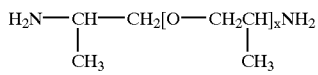

wherein x is equal to 33.1, and

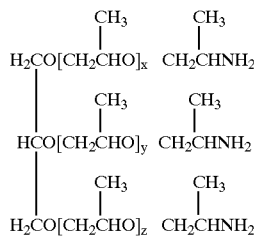

wherein (x+y+z) is equal to 81.

20. A method for retrofitting an exterior surface of a house or building comprising:

attaching a foam board to an exterior surface of a house or building such that an inner surface of the foam board is adjacent to the exterior surface of the house or building, wherein the inner surface of the foam board has a surface profile that is a mirror image of the exterior surface of the house or the building;

applying a first coating on an outer surface of the foam board; and applying a second coating onto an outer surface of the first coating; wherein the first coating comprises an aromatic polyurea, and the second coating comprises at least one of a filler and a pigment.

21. The method of claim 20, wherein the filler comprises at least one of sand, glass, fibers, calcium carbonate, coal, granite, silica, clay, talc, mica, ceramics, flame retardants, multicolored quartz, and sea shells.

22. A retrofitted building made by the method of claim 20.

23. The method of claim 20, wherein the exterior surface is a wall of the house or building.

24. The method of claim 23, wherein the wall of the house or building comprises hardboard.

25. The method of claim 20, wherein the aromatic polyurea is formed by reacting (a) one or more polyether diamines, (b) one or more polyether triamines, (c) one or more diethyltoluenediamines, (d) N,N'-di-sec-butyl-4,4'-methylene dianiline, and (e) one or more isocyanates.

26. The method of claim 25, wherein the one or more polyether diamines comprise at least one of

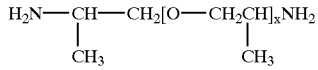

wherein x is equal to 33.1; and the one or more polyether triamines comprise at least one of

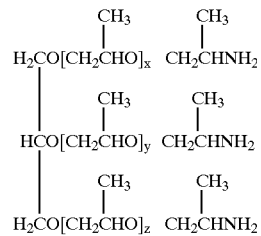

wherein (x+y+z) is equal to 81.

27. A method for retrofitting a wall of a house or building comprising:

attaching a foam board to the house or building, wherein an inner surface of the foam board is facing the wall of the house or building; and applying a first coating on an outer surface of the foam board, wherein the first coating comprises a polyurea.

28. A retrofitted building made by the method of claim 27.

29. The method of claim 27, wherein the polyurea comprises an aliphatic polyurea and at least one of a filler and a pigment.

30. The method of claim 27, wherein the method further comprises:

applying a second coating on an outer surface of the first coating; wherein the first coating comprises an aromatic polyurea, and the second coating comprises at least one of a filler and a pigment.

31. The method of claim 29, wherein the aliphatic polyurea is formed by reacting (a) one or more polyether diamines, (b) one or more polyether triamines, and (c) one or more isocyanates.

32. The method of claim 31, wherein the one or more polyether diamines comprise at least one of

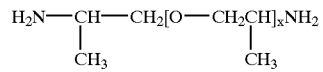

wherein x is equal to 33.1; and the one or more polyether triamines comprise at least one of

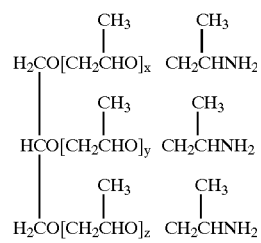

wherein (x+y+z) is equal to 81.

33. The method of claim 30, wherein the aromatic polyurea is formed by reacting (a) one or more polyether diamines, (b) one or more polyether triamines, (c) one or more diethyltoluenediamines, (d) N,N'-di-sec-butyl-4,4'-methylene dianiline, and (e) one or more isocyanates.

34. The method of claim 33, wherein the one or more polyether diamines comprise at least one of
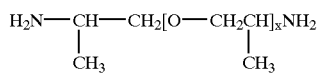
wherein x is equal to 33.1; and the one or more polyether triamines comprise at least one of
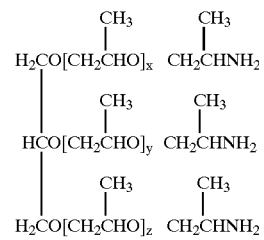
wherein (x+y+z) is equal to 81.
* * * * *